(12) United States Patent
Arcedera et al.

(10) Patent No.: US 7,506,098 B2
(45) Date of Patent: Mar. 17, 2009

(54) OPTIMIZED PLACEMENT POLICY FOR SOLID STATE STORAGE DEVICES

(75) Inventors: Mark Arcedera, Paranaque (PH); Reyjan C. Lanuza, Taguig (PH); Ritchie Babaylan, Cavite (PH)

(73) Assignee: BiTMICRO Networks, Inc., Fremont, CA (US)

( * ) Notice: Subject to any disclaimer, the term of this patent is extended or adjusted under 35 U.S.C. 154(b) by 228 days.

(21) Appl. No.: 11/450,005

(22) Filed: Jun. 8, 2006

(65) Prior Publication Data

US 2007/0288686 A1 Dec. 13, 2007

(51) Int. Cl.
*G06F 12/00* (2006.01)
(52) U.S. Cl. .......................................... 711/103; 710/22
(58) Field of Classification Search .................. 711/103; 710/22

See application file for complete search history.

(56) References Cited

U.S. PATENT DOCUMENTS

| | | | | |
|---|---|---|---|---|
| 5,822,251 A | * | 10/1998 | Bruce et al. ............. | 365/185.33 |
| 2002/0141244 A1 | * | 10/2002 | Bruce et al. ............. | 365/185.33 |
| 2003/0217202 A1 | * | 11/2003 | Zilberman et al. ............. | 710/22 |
| 2004/0073721 A1 | * | 4/2004 | Goff et al. ..................... | 710/22 |

* cited by examiner

*Primary Examiner*—Kevin Ellis
*Assistant Examiner*—Hashem Farrokh
(74) *Attorney, Agent, or Firm*—Dennis Fernandez; Stephen R. Uriarte (57) ABSTRACT

A data storage system is provided comprising several flash arrays in a board and stacking these boards to attain a high-capacity solid state hard drive. A remap table is used to map all logical addresses from a host system to the actual physical addresses where data are stored. The assignments of these physical locations are done in such a way that the load of the system is evenly distributed to its available resources. This would ensure that the storage system will run at its utmost efficiency utilizing its resources properly. To achieve this, the system would make sure that the physical location of data be evenly distributed according to the current load of the system.

7 Claims, 13 Drawing Sheets

| Section x Chip Interleave | Section | PBA | | | |
|---|---|---|---|---|---|
| | | Flash Device Location | | | Flash Address |
| | | Bus | Engine | Group | |
| 0 | A0 | 0 | 0 | 0 | 0 |
| | B0 | 1 | 2 | 0 | 0 |
| | C0 | 2 | 4 | 0 | 0 |
| | D0 | 3 | 6 | 0 | 0 |
| 1 | A1 | 4 | 8 | 0 | 0 |
| | B2 | 5 | 10 | 0 | 0 |
| | C2 | 6 | 12 | 0 | 0 |
| | D2 | 7 | 14 | 0 | 0 |
| ⋮ | | | ⋮ | | ⋮ |
| 14 | A14 | 0 | 1 | 1 | 0x8 |
| | B14 | 1 | 3 | 1 | 0x8 |
| | C14 | 2 | 5 | 1 | 0x8 |
| | D14 | 3 | 7 | 1 | 0x8 |
| ⋮ | | | ⋮ | | |

| Bus 0 | |
|---|---|
| FDE 0 | FDE 1 |
| Read | Write |
| Erase | Write |
| Write | |

| Bus 1 | |
|---|---|
| FDE 2 | FDE 3 |
| Read | Write |
| Write | Write |

| Bus 2 | |
|---|---|
| FDE 4 | FDE 5 |
| Read | Read |
| Read | Write |
| Write | |

| Bus 3 | |
|---|---|
| FDE 6 | FDE 7 |
| Read | Write |
| Write | Write |
| Write | |

| Bus 4 | |
|---|---|
| FDE 8 | FDE 9 |
| Read | Read |
| Write | Write |

| Bus 5 | |
|---|---|
| FDE 10 | FDE 11 |
| Write | Read |
| Read | Write |
| Write | Write |

| Bus 6 | |
|---|---|
| FDE 12 | FDE 13 |
| Read | Write |
| Write | Write |

| Bus 7 | |
|---|---|
| FDE 14 | FDE 15 |
| Write | Read |
| | Write |

| Section x Chip Interleave | Section | PBA | | | |
|---|---|---|---|---|---|
| | | Flash Device Location | | | Flash Address |
| | | Bus | Engine | Group | |
| 0 | A0 | 0 | 0 | 0 | 0 |
| | B0 | 1 | 2 | 0 | 0 |
| | C0 | 2 | 4 | 0 | 0 |
| | D0 | 3 | 6 | 0 | 0 |
| 1 | A1 | 4 | 8 | 0 | 0 |
| | B2 | 5 | 10 | 0 | 0 |
| | C2 | 6 | 12 | 0 | 0 |
| | D2 | 7 | 14 | 0 | 0 |
| ⋮ | | | ⋮ | | ⋮ |
| 14 | A14 | 0 | 1 | 1 | 0x8 |
| | B14 | 1 | 3 | 1 | 0x8 |
| | C14 | 2 | 5 | 1 | 0x8 |
| | D14 | 3 | 7 | 1 | 0x8 |
| ⋮ | | | ⋮ | | |

FIG. 13

OPTIMIZED PLACEMENT POLICY FOR SOLID STATE STORAGE DEVICES

BACKGROUND

1. Field

The present invention relates to computer data storage systems. More particularly, the present invention relates to a system and method of mapping all logical addresses from a host system to physical addresses of data storage devices for improving host computer data access performance.

2. Description of Related Art

As flash devices are getting cheaper, solid state based hard drives are getting more popular as replacement for traditional mechanical hard drives. Mechanical hard drives suffer in areas unseen in flash memory based drives due to its many moving parts (electrical motor, spindle shaft, read/write head, and a magnetic rotating disk). This leads to reliability problems especially when exposed to vibration and shock. Not only that, it also causes slow access time when fetching data from different areas of mechanical drive.

Since flash memory based drives typically have no moving parts, it can easily withstand harsh environmental conditions and physical mishandling that would lead to failures in regular mechanical drives. Also, access to a flash device does not suffer from the same problem as rotating drives wherein access time is increased if it is accessing data that are physically far from each other (since it requires head movements).

However, there are also several problems associated with using flash based drives over rotating drives. Flash devices cannot be written to when it is not in the erased state. After it has been written, the only way to bring it back to its erased state is to erase a larger block of flash called erase block or simply flash block which is the minimum amount of data that can be erased. Typical flash technology (specifically NAND flash) doesn't allow toggling of individual bytes from a programmed state back to its erased state. That means that when a host requests to change an existing sector via logical block address or LBA, the flash physical block location (addressed via physical block address or PBA) that contains this data must be erased first before attempting to write it with the new data. Considering that erase operations typically takes much longer in comparison to write or read operations, this greatly impacts the performance of the system. To avoid this performance degradation, applications usually don't place the new data to its old physical location but instead finds a new one (that is already erased) and relocates the logical sector to a new physical location and thus skips the erase operation. The old block would then be erased in the background. Since hosts are designed with typical rotating drives in mind, it knows that the sectors are "write in place" and not relocated to a different location so a different layer needs to handle the dynamic changes that occur within a flash-based drive. Some implementation do this on the file system where a new layer called "Flash Translation Layer" is the one that handles the mapping while others do it on the actual flash controller itself so that hosts will never see the difference.

Another unique characteristic of flash memory devices is that it has the tendency to wear-out when subjected to a certain amount of erase cycles (typically 100,000 cycles). This wearing-out leads to bad blocks and thus requires some sort of a bad block management to handle this. To prevent certain memory blocks from degrading much faster than the other blocks, a wear-leveling mechanism is required to assure that each and every block wears out evenly.

Current flash based systems have addressed these issues either at the file system level or embedded in the actual flash controller however most of them are targeted to single flash device or just a small array of flash devices. In order for flash-based hard drives to take over the rotating drives market share, it should be able to match the capacities of these drives. To achieve this, there is a need to create a system of several flash arrays in a board and stack these boards to attain a high-capacity solid state hard drive. To increase the performance, systems can allow parallel access to these flash arrays and also take advantage of new flash device features like multi-bank (sometimes called multi-plane) and copy-back. Existing approaches in selection of flash blocks for new physical location, replacement of bad blocks, or wear-leveling doesn't pay much attention on where to get these blocks, they simply do this in a round robin manner to spread out the access. With flash based systems allowing significant performance gains by correctly selecting the target blocks, it is important to have a good mapping scheme to take advantage of these features.

BRIEF SUMMARY OF THE INVENTION

In one embodiment of the invention, a remap table, sometimes referred to as an LBA-PBA Map Table, is used to map all logical addresses from a host system to the actual physical addresses where data are stored. The assignments of these physical locations are done in such a way that the load of the system is evenly distributed to its available resources. This would ensure that the storage system will run at its utmost efficiency utilizing its resources properly. To achieve this, the system would make sure that the physical location of data be evenly distributed according to the current load of the system.

BRIEF DESCRIPTION OF THE SEVERAL VIEWS OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTION OF THE INVENTION

Figure 1:
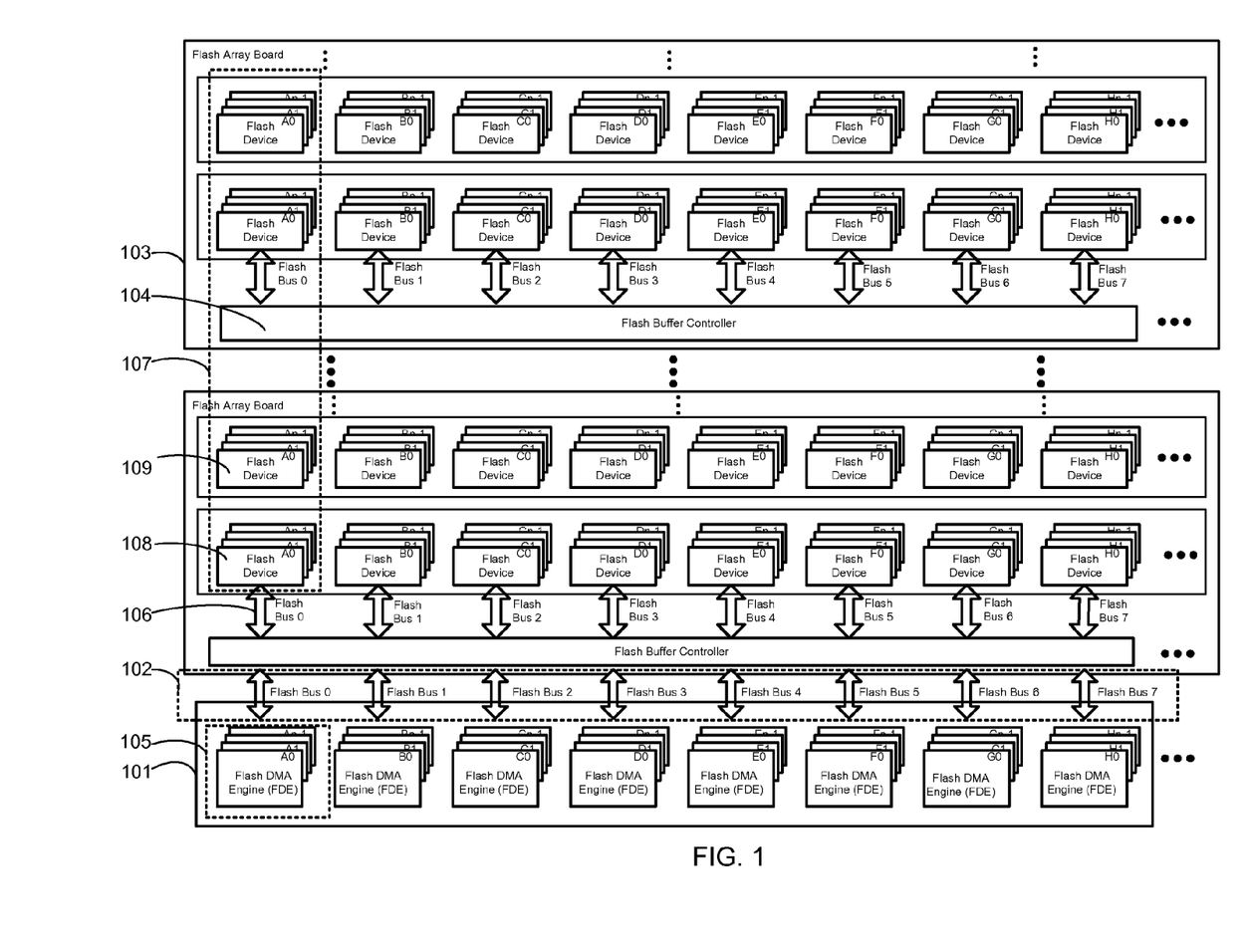
FIG. 1 is a sample Flash Based Drive architecture with multiple flash chips, also referred herein as flash devices, accessed by multiple Flash DMA Engines according to an embodiment of the present invention.

FIG. 1 shows an exemplary architecture that accommodates a very large number of flash arrays to achieve large capacities according to an embodiment of the present invention. The system comprises a number of Flash DMA, or Direct Memory Access, Engines (FDEs) 101. A Flash DMA Engine (FDE) is basically an intelligent DMA controller that facilitates high speed data transfers to/from a group of flash memory devices. The system also contains a set of flash buses 102, which is a bus interface used by the FDE to connect to the flash memory devices. To increase capacity, a number of expansion boards, also referred herein as flash array boards, 103 can be added. An expansion board is essentially a memory board that consists of a pool of flash memory devices for additional storage and a Flash Buffer Controller 104 for communicating to the Flash DMA Engine. The Flash Buffer Controller is a controller that drives the flash bus and translates the command signals from the FDEs into native flash commands that can be understood by the target flash chip. The number of buses/engines can be increased/decreased according to the required performance, cost, and storage capacity of the system.

The flash array organization comprises a set of Flash DMA Engines controlling multiple flash devices across a set of flash buses. The set of flash devices assigned to a particular flash bus is called a "flash array bank". Each bank can be partitioned into any number of flash array banks with the Flash DMA Engines sharing a flash bus. For example in FIG. 1, it is shown that a group of n number of Flash DMA Engines, such as group 105, shares a single Flash Bus0 106.

Each Flash DMA Engine is assigned to control a set of flash devices. This set of flash devices is said to belong to a flash array bank interleave. In addition, each flash device within this interleave is said to belong to a different flash group. From FIG. 1, all flash chips labeled 'A0' within flash array bank interleave 107 is controlled by Flash DMA Engine A0 and each of the flash device within this interleave belongs to a different group. For example, the first flash device A0 108 belongs to Group 0, second flash device A0 109 belongs to Group 1, and so on.

To optimize access to this very large array of flash devices, a number of operations are done in parallel. There are three (3) methods of interleaving that are easily supported in this system; these are bus, flash array bank and group interleaving. Bus interleaving is the transfer of data to/from flash devices using the different flash buses. The flash array bank interleaving method on the other hand, is the transfer of data to/from flash devices belonging to the same bus but in different Flash DMA Engines. Lastly, group interleaving is the transfer of data by a certain Flash DMA Engines to/from different flash devices it controls.

The main advantage of implementing the bus interleaving method is that the flash access is done in parallel utilizing the different flash buses, i.e. Flash Bus 0, Flash Bus 1, Flash Bus 2, and so on. Each Flash DMA Engine uses a different flash bus in order to achieve parallel operations. Flash array bank interleaving has parallel operations during flash access by utilizing the busy signal status of the active flash bus. As an example, one engine (FDE A0, where FDE stands for Flash DMA Engine, the term FDE and DMA Engine is used interchangeably in this document) is writing data to a flash device (flash device A0) while FDE A0 is waiting for the command completion, other FDE of different bank interleave, e.g., FDE A1, can access Flash Bus 0 and send out a command to a different target flash device such as flash device A1. Accordingly, group interleaving performs parallel operations by having a specific FDE send multiple commands to different flash devices it controls. As an example, one engine (FDE A0) sends a command to a flash device A0 of Group0. While FDE A0 is waiting for the command to be completed and the flash bus is temporarily idle, FDE A0 can send another command to a flash device in another group, e.g., flash device A0 of Group 1, in order to achieve optimum data transfer.

From this, it can be seen that data transfers are most efficient if flash devices are accessed using different flash bus (bus interleaving), then using different Flash DMA Engine (flash array bank interleaving) and lastly different group (group interleaving). Another feature of new flash devices is its multi-bank capability. A single flash device is sub-divided into four (4) banks wherein parallel operation can occur. In a Multi-Bank operation, an FDE can target up to four (4) different blocks in a target flash device and up to four (4) blocks can be erased and/or programmed using a single request.

To take advantage of this parallel operation, a mapping scheme that considers all these capabilities must be created. To lessen the size of the LBA-PBA Map Table, a section size is defined to be the minimum relocatable area. Assuming an LBA size is 512 bytes and the section size is 4 KB, only one entry is needed for every eight (8) LBAs. The section size is primarily limited by the native page size of a flash device. A page is smaller than the minimum erase size used for erasing data in a flash block. In the example shown, the minimum erase size used is equal to the flash block size. A flash block is made up of multiple pages. It is always a multiple of this page size since a NAND flash is usually programmed on a per page basis. Since the section size is the minimum relocatable region, when only five (5) LBAs are updated, the other three (3) LBAs must be relocated together with the new data. Smaller section would therefore lead to more flexibility but larger overhead to maintain the LBA-PBA mapping. Although large section might suffer because of the need to relocate the unmodified data, a typical OS or Operating System, usually accesses the media in larger blocks like 4 KB. The choice of the section size depends largely on how the host accesses the media. The larger the host access is, the more acceptable it is to use large section size to minimize the LBA-PBA mapping without suffering from the need to relocate unmodified data. Taking the concept wherein applications for rotating drives tend to optimize sequential access, this system as illustrated in FIG. 1 should take advantage of this and optimize for sequential access. Therefore, an exemplary ideal layout is illustrated in FIG. 2.

Figure 2:
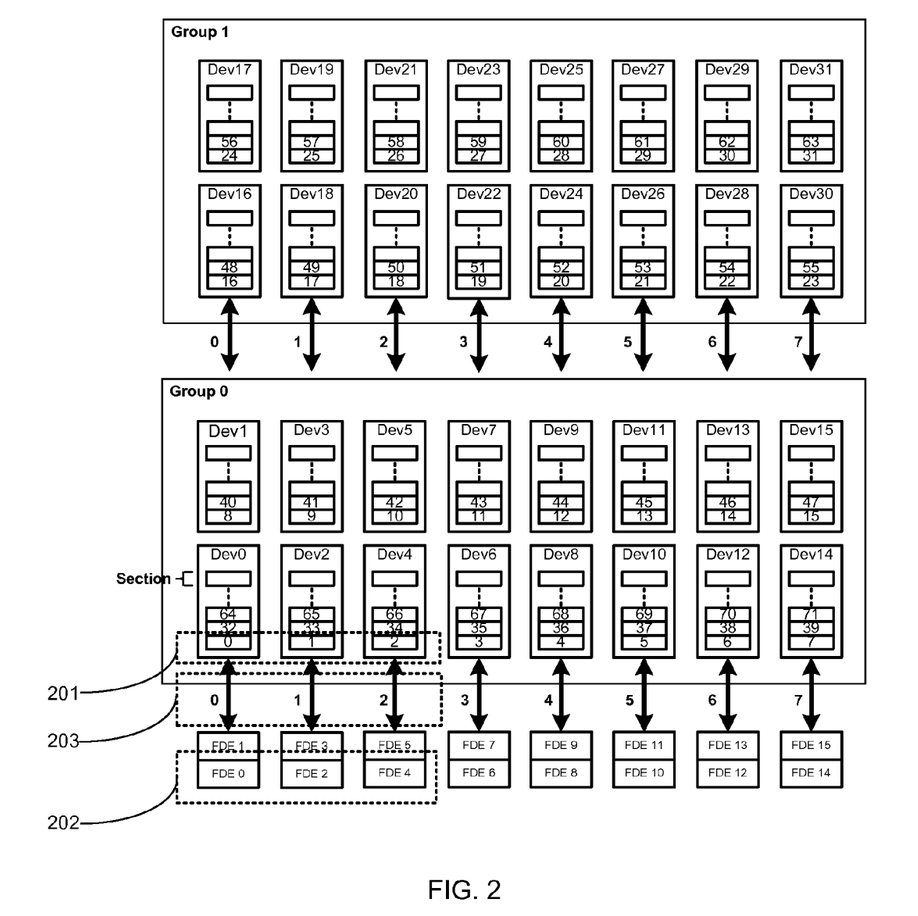
FIG. 2 is a sample physical layout of data sections according to an embodiment of the present invention.

FIG. 2 is a sample physical layout of data sections according to an embodiment of the present invention. For illustrative purposes, the system shown in FIG. 2 has sixteen (16) DMA Engines with two (2) engines sharing a bus. Each engine also controls two (2) flash devices for a total of thirty-two (32) flash devices. In this example, a section consists of eight (8) LBAs. As can be seen from FIG. 2, consecutive sections are distributed all throughout the entire flash arrays taking advantage of bus interleaves, then engine, interleaves, then group interleaves. In this way, when the hosts requests for LBAs 0-23, equivalent to sections 0-2 (shown as element 201), the requests will go through FDEs 0, 2, 4 (shown as element 202) utilizing buses 0, 1, 2 (shown as element 203). Twenty-four (24) LBAs are equivalent to three (3) sections. This layout is ideal for sequential access. This layout is ideal because the mapping is able to take advantage of bus interleaving (then bank interleaving, and group interleaving) that the system provides. So whenever the host accesses data sequentially, the mapping assures that the system will fetch the data in the most efficient or parallel way, taking advantage of the bus interleaving then bank interleaving and then group interleaving. But as noted before, due to the inherent characteristic of flash devices requiring erase cycles before writing new data, write operations will trigger the data to be relocated to new locations that have been previously erased (to save on erase cycles).

Figure 3:
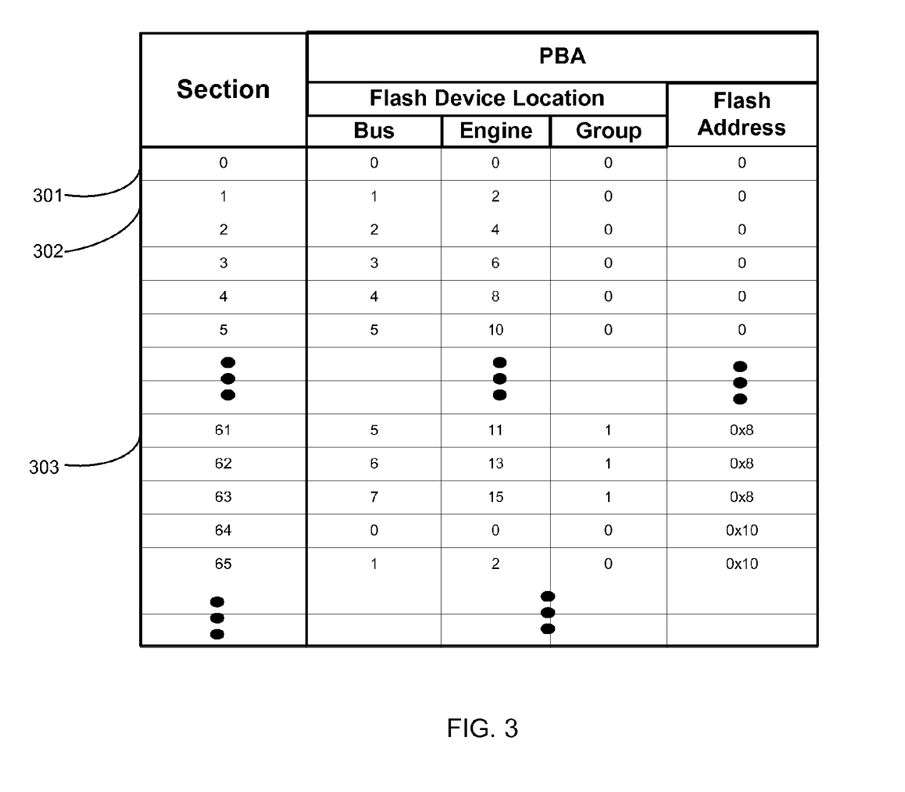
FIG. 3 is the LBA-PBA Map Table for the layout shown in FIG. 2 according to an embodiment of the present invention.

FIG. 3 is the LBA-PBA Map Table for the layout shown in FIG. 2 according to an embodiment of the present invention. FIG. 3 shows how the LBA-PBA Map Table will look like based on the FIG. 2 layout. A section consists of a group of LBAs. In this example, a section (corresponding to a row in the table) consists of eight (8) LBAs. The PBA stored here contains the information for both the location of the flash device, uniquely identified using its engine number (bus number was added to illustrate bus interleaving but each engine is associated with only one bus) and group number, and the address within the flash device. From FIG. 2, the first physical section of Dev0 is labeled as Section 0, the first physical section of Dev2 is labeled as Section 1 . . . , the second physical section of Dev0 is labeled as Section 32, and so on. Correspondingly, in FIG. 3, Section 0 301 is located at Dev 0, which has a unique address Bus 0, Engine 0, Group 0 and is in address 0 within that flash device. Section 1 302 is located at Dev 2, which has a unique address Bus 1, Engine 2, Group 0 and is in address 0 within that flash device. Section 61 303 is located at Dev 27, which has a unique address Bus 5, Engine 11, Group 1 and is in address 0x08 within that flash device. Assuming the flash is addressable every 512 bytes and a section is 4 KB in size, address 0x08 represents the second physical section (or the second 4 KB unit) within a flash device, address 0x10 the third physical section (or the third 4 KB unit) and so on. The 512 byte addressable unit means that every flash address represents 512 bytes so address 0x00 is the first 512 bytes, address 0x01 the second 512 bytes, and so on. That leads to address 0x00-0x07 representing first 4 KB of a flash device and 0x08-0x0F the next 4 KB. The 512 byte addressable unit is just an arbitrary value for the system, it can be byte addressable leading to address 0x0000-0x0FFF representing the first 4 KB and address 0x1000-0x1FFF the next 4 KB.

Mapping also plays a major role to look up target physical locations for bad block management, for wear-leveling and most importantly for write operations. In write operations, instead of writing the new data in its old physical location, an erased physical location is obtained and the logical block is remapped there to save an erased cycle. Determining the new physical location is dependent on the current load of the system. As mentioned, the illustrated storage system works in the most optimum way when it takes advantage of the parallel operations it can execute at a given time with the bus interleaving being the most beneficial (then engine interleaving, then group interleaving). That means that whenever the system needs to determine a new physical location, it must take this into consideration. When the system currently uses FDE 0 utilizing Bus0 and FDE 2 utilizing Bus 1, it would prioritize looking for physical locations located in flash devices that have an address with bus number not equal to 0 or 1 to take advantage of bus interleaving. On the other hand, if the system has already utilized Buses 0-7, it then checks what particular engine that is not being used to take advantage of engine interleaving (i.e. if Engine 0, 1, 2, 3, 4, 6, 8, 10, 12, 14 is in use, look for a location that is addressed in either Engine 5, 7, 9, 11, 13, 15 because that is the one that can take advantage of engine interleaving).

Figure 4:
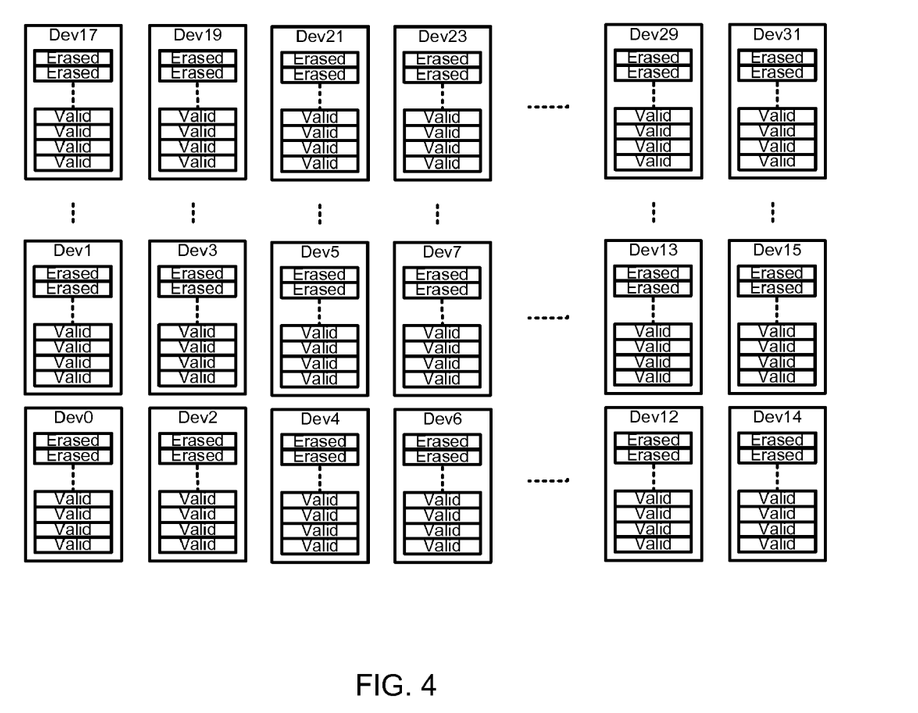
FIG. 4 is a physical layout with erased sections according to an embodiment of the present invention.

FIG. 4 is a physical layout with erased sections according to an embodiment of the present invention. FIG. 4 shows the distributed erased sections of the system. These erased sections will be the ones used when a write request need a new location. Only a small amount of the total storage needs to be reserved, this area can be used in conjunction with bad block replacements. The reserved amount depends on the capacity of the drive and the frequency of write requests it is subjected to. For a 60 GB drive, a 2-3% area or about 1-2 GB is efficient enough to provide erased sections as demanded with the stale blocks erased in the background. The location of the free sections needs only to be distributed to all the flash arrays in the system and can be distributed in anyway within the flash device since access time within a flash is unaffected by its location. However, for flash devices offering multi-bank support, a flash device is divided into different banks with concurrent operation capability. For this case, the reserved pre-erased sections are distributed to the different banks of a flash chip to take advantage of the concurrent operation feature.

Figure 5:
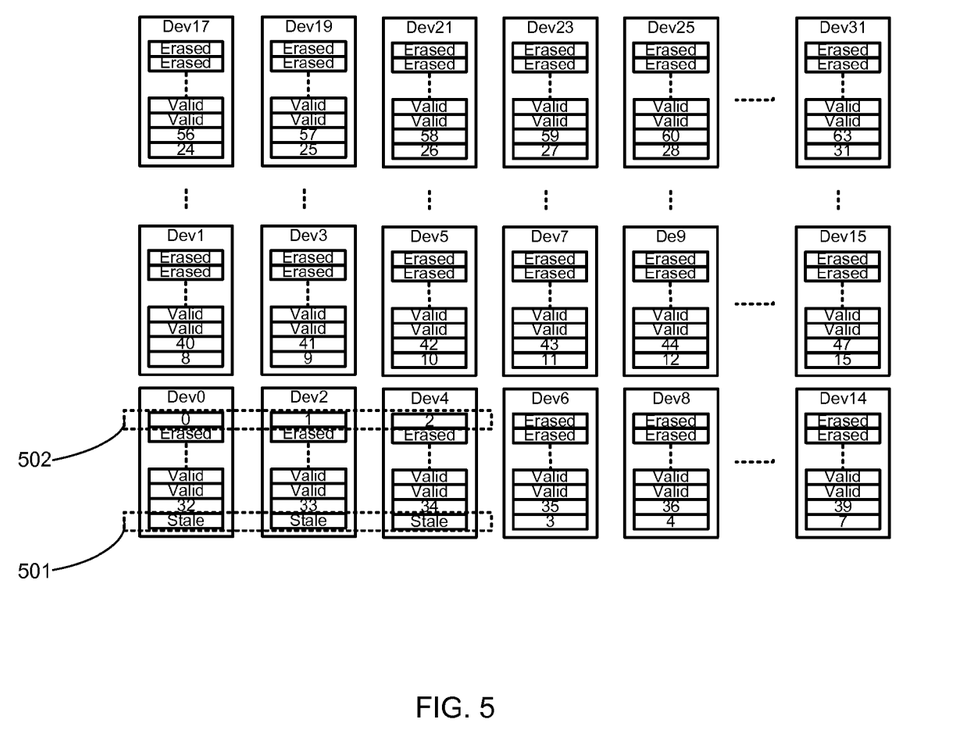
FIG. 5 is a block diagram illustrating how sections are placed to its new location when a write request is issued for that data section according to an embodiment of the present invention.

To prevent inefficient access to the storage system due to the need to relocate data to a different physical location on every write request, the placement policy assures that the resources are utilized properly. FIG. 5 is a block diagram illustrating how sections are placed to its new location when a write request is issued for that data section according to an embodiment of the present invention. Due to the write request for LBAs 0-23, sections 0-2, which holds this data, was relocated from its previous location 501 to the previously erased sections 502. This would mean that when the host reads this data, it is still fetched in parallel as before. So not only will this approach increase efficiency during the write operation, it was also able to provide efficient access for future read operations of this data. For flash-based systems, the important thing is to spread out the data to different flash chips to take advantage of parallel access. Initially, the drive itself is optimized for sequential access (as seen in FIG. 2) but as the host issues the write requests, the flash based system quickly adopts to the current load. The placement policy would force all the write requests to spread evenly across the entire system. As a consequence of spreading the locations, all consecutive requests would naturally go to different flash chips. In a typical scenario wherein related requests are done together, future reads to this data would also be optimized since related blocks would probably be spread out. How optimized the consequent layout would be largely dependent on how the Host issues its write requests. In a single process, this would be most optimized since requests are being generated by one source only. In a multi-user/process environment, requests come from different sources and the Host typically interleaves this. But even so, the placement policy would still be able to spread out related blocks although not as efficient since it is interleaved with other requests.

Figure 6:
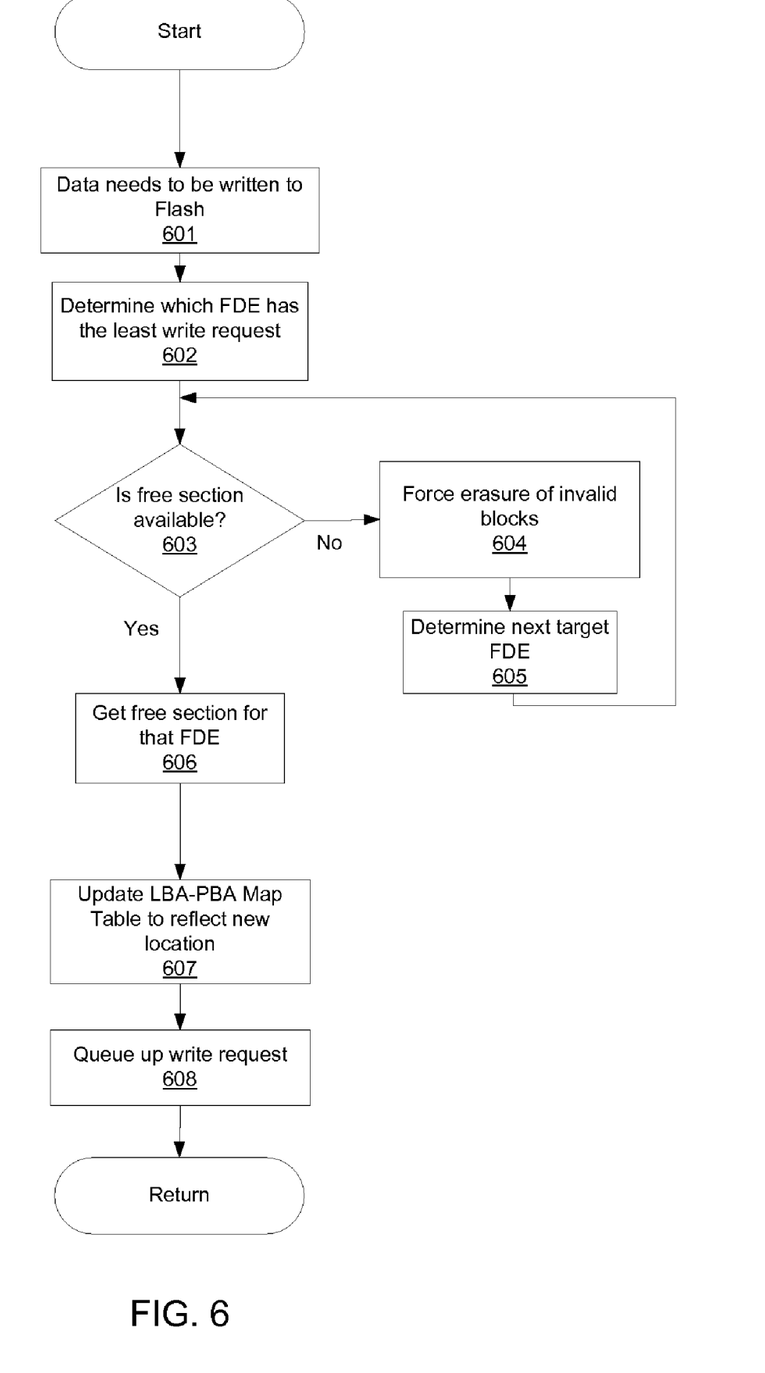
FIG. 6 is a flow chart illustrating the process of writing data to the Flash array according to an embodiment of the present invention.

FIG. 6 shows the typical process when doing writes to flash devices. Basically whenever the system needs to write data to the flash array 601, it first determines the current load of the FDE to determine which FDE has the least write request 602 to see where to put the new data. If a free section is not available, the system may force erasure of invalid blocks 604 and determine the next target FDE 605. If a free section is available 603, the system may get a free section for that FDE 606. The system may update an LBA-PBA Map Table to reflect the new location 607 and queue up a write request 608. In addition to determining the FDE, it can also determine to which flash device controlled by that FDE is optimum. If for example, it will put the request to FDE 8 and sees there is a request for Group 0, it will then prioritize the placement to Group 1 to take advantage of multi-group operation. To take advantage of the multi-bank support of new flash devices, target sections can also consider this. For example, if there is a request for Flash Dev 4 targeting Bank 0, it can prioritize a request for Bank 1 of that flash device. This is of course after bus, engine and group prioritization.

Figure 7:
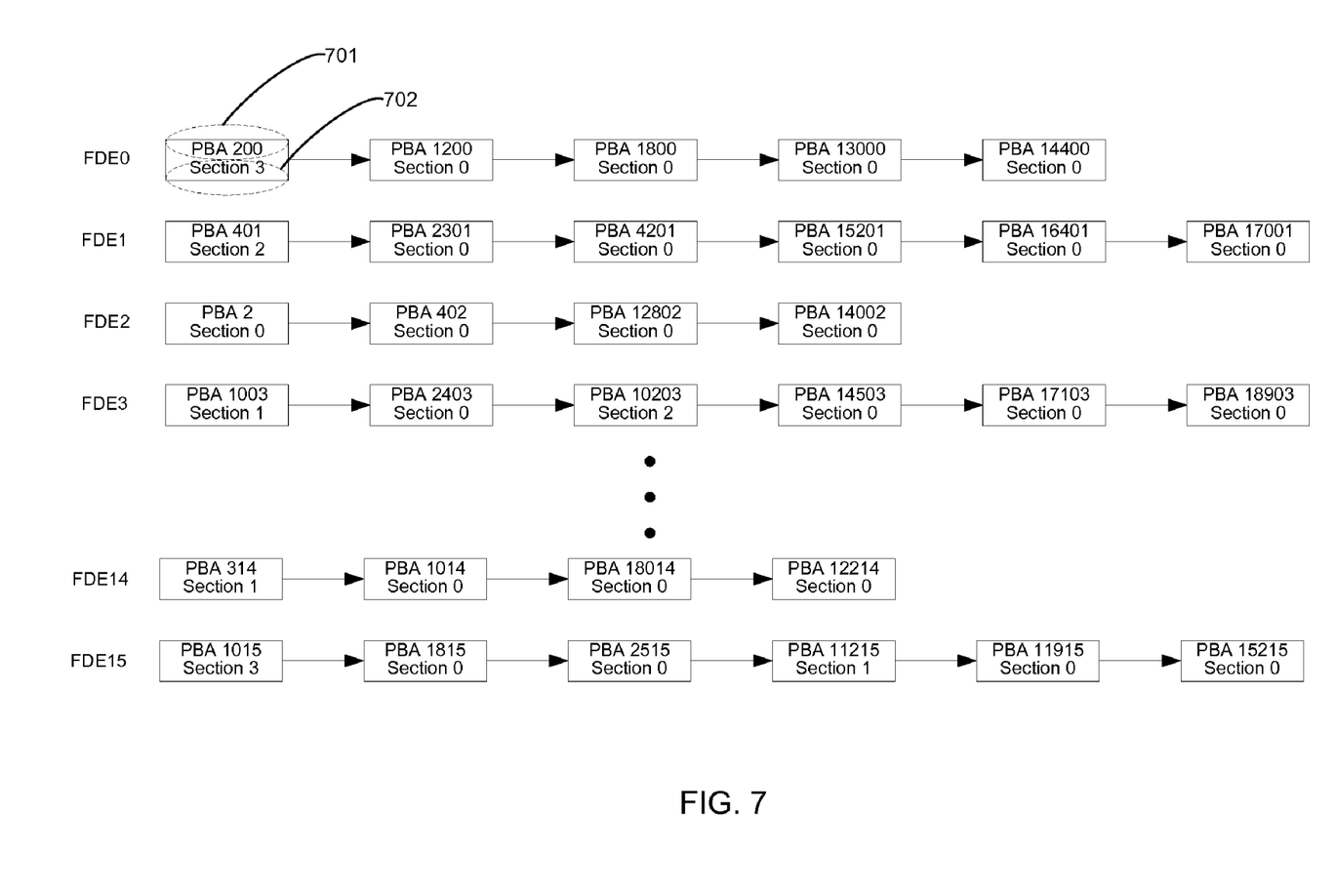
FIG. 7 is a block diagram illustrating a list of pre-erased sections according to an embodiment of the present invention.

FIG. 7 shows a simple way of listing all the available erased sections that can be utilized per engine for easy fetching of new locations. It holds the physical location 701, which contains all the needed information like the FDE number, group location, and block address within the chip. Additionally, it contains the section index 702, which is the next free section within a flash block. For simplicity and because of certain flash chips limitation that pages within a flash block can be programmed sequentially only, this index will just increment from zero (0) (entire flash block is erased) to the maximum index (three (3) if there are four (4) sections in a block. For example, a 4 KB section in a 16 KB block). So if only one section is needed, the index will just be incremented but if an entire block is needed, only the free entry with Section 0 can be utilized.

Figure 8:
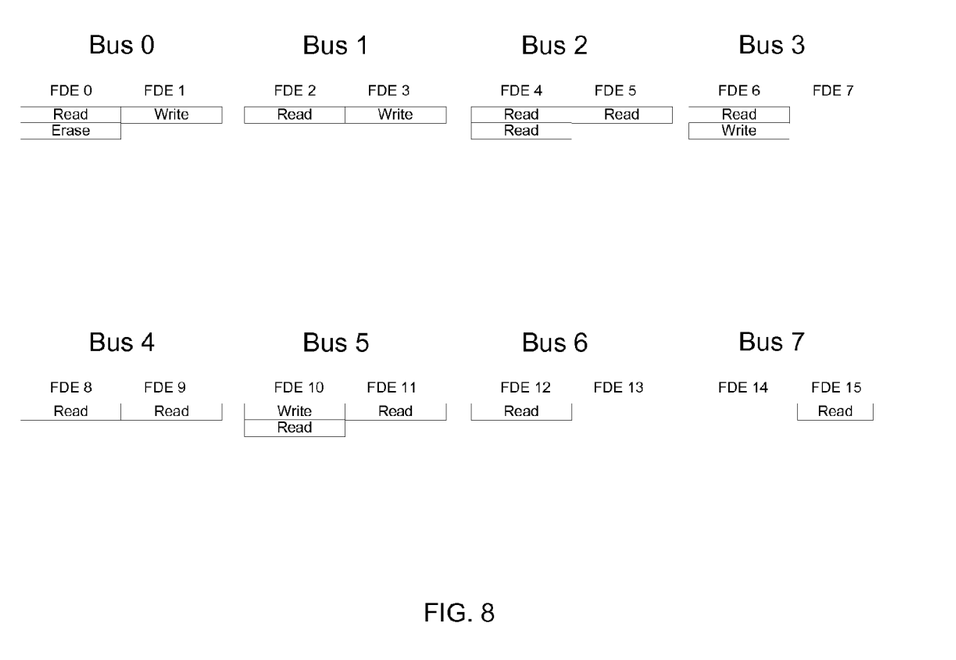
FIG. 8 is a block diagram illustrating the queue of pending operations for the Flash DMA Engines according to an embodiment of the present invention.

FIG. 8 shows a sample snapshot of the queue operations waiting for each Flash DMA Engine. When a new write request is needed, the placement policy will determine what physical locations are prioritized. The easiest way is just to do a round-robin scheme wherein the priority just rotates in a fixed manner (FDE 0, 2, 4, . . . 14, 1, 3 . . . 15 for Group 0 flash devices then for Group 1, etc). This assures that all write operations have been evenly distributed. The drawback on this is that it doesn't consider the other operations that the engines are currently working on and thus might cause some unwanted delays. This can be resolved by using some threshold in which if a certain engine has too much workload with respect to others, that engine will simply be skipped in the rotation. For example, if a particular engine has five (5) more entries than the minimum of all the engines, it will just be skipped in the rotation and the next will be given the workload.

Figure 9:
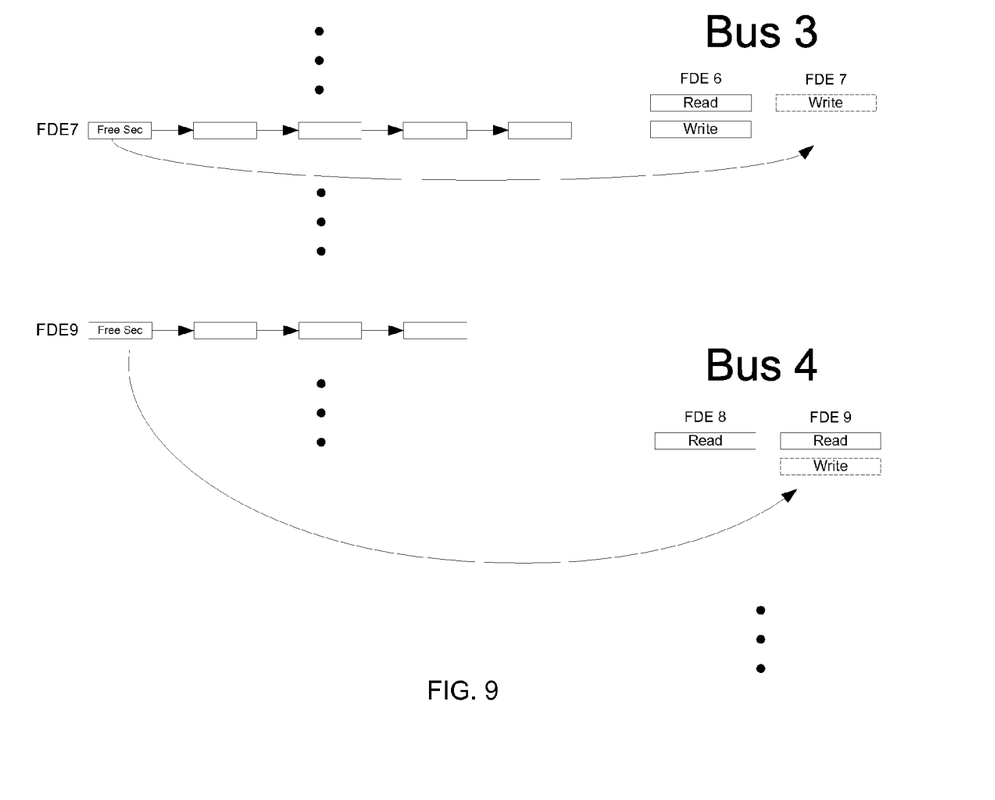
FIG. 9 is a block diagram illustrating how new write operations are to be added to the queue of the Flash DMA Engines according to an embodiment of the present invention.
Figure 10:
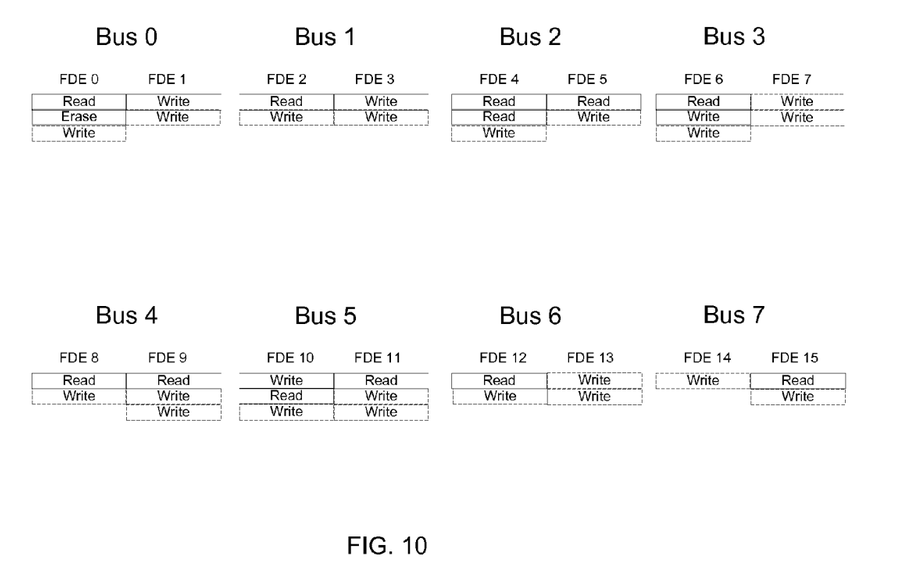
FIG. 10 is a block diagram illustrating an updated snapshot of the queue of pending operations according to an embodiment of the present invention.

FIG. 9 shows how the first two (2) write requests being added to the queue of Flash DMA Engine operations. It shows the fetching of free sections from their respective engines and using that section for the new write requests. Assuming no request has been finished, the queue may look like FIG. 10 after queuing up twenty (20) write requests evenly distributed through all DMA Engines.

Figure 11:
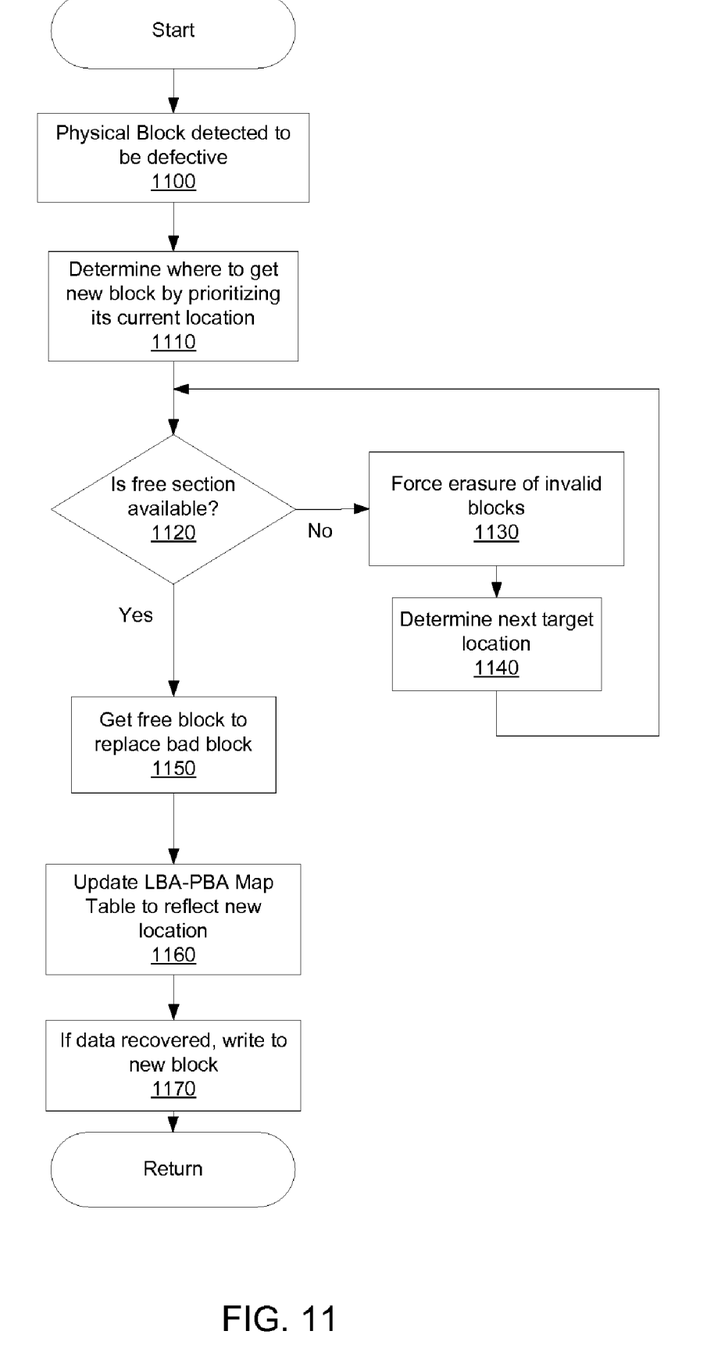
FIG. 11 is a flowchart illustrating the process for Bad Block Management according to an embodiment of the present invention.

FIG. 11 shows the flow on how to manage bad blocks. When the system-detects a bad block, a block which is defective 1100, it needs to remap it to a good block. To retain the distribution created when that data was first written, the target block will be prioritized 1110 by looking at a free block (from the erased list with Section=0) on the same flash device, then different flash device controlled by the same engine, flash devices on a different engine but the same bus and so on. The system may determine if a free section is available 1120. If no free section is available, then the system may force erasure of invalid blocks 1130 and determine the next target location 1140. If a free section is available, the flow may get a free block to replace the bad block 1150 and an update the LBA-PBA Map Table to update the new location 1160 will be accomplished. Also, if any data is recovered, a write to the new block 1170 will also be accomplished.

To further spread out the user data without increasing the size of the LBA-PBA Map Table, a striping feature can be utilized. Striping forces parallel access at a lower level compared to what a section size can provide. There are programmable parameters for striping, one is the stripe size and the other is the number of chip interleaves. Stripe size means the number of contiguous LBAs in a chip before moving on to the next chip. Number of chip interleaves means the number of chips the stripe will be distributed.

Figure 12:
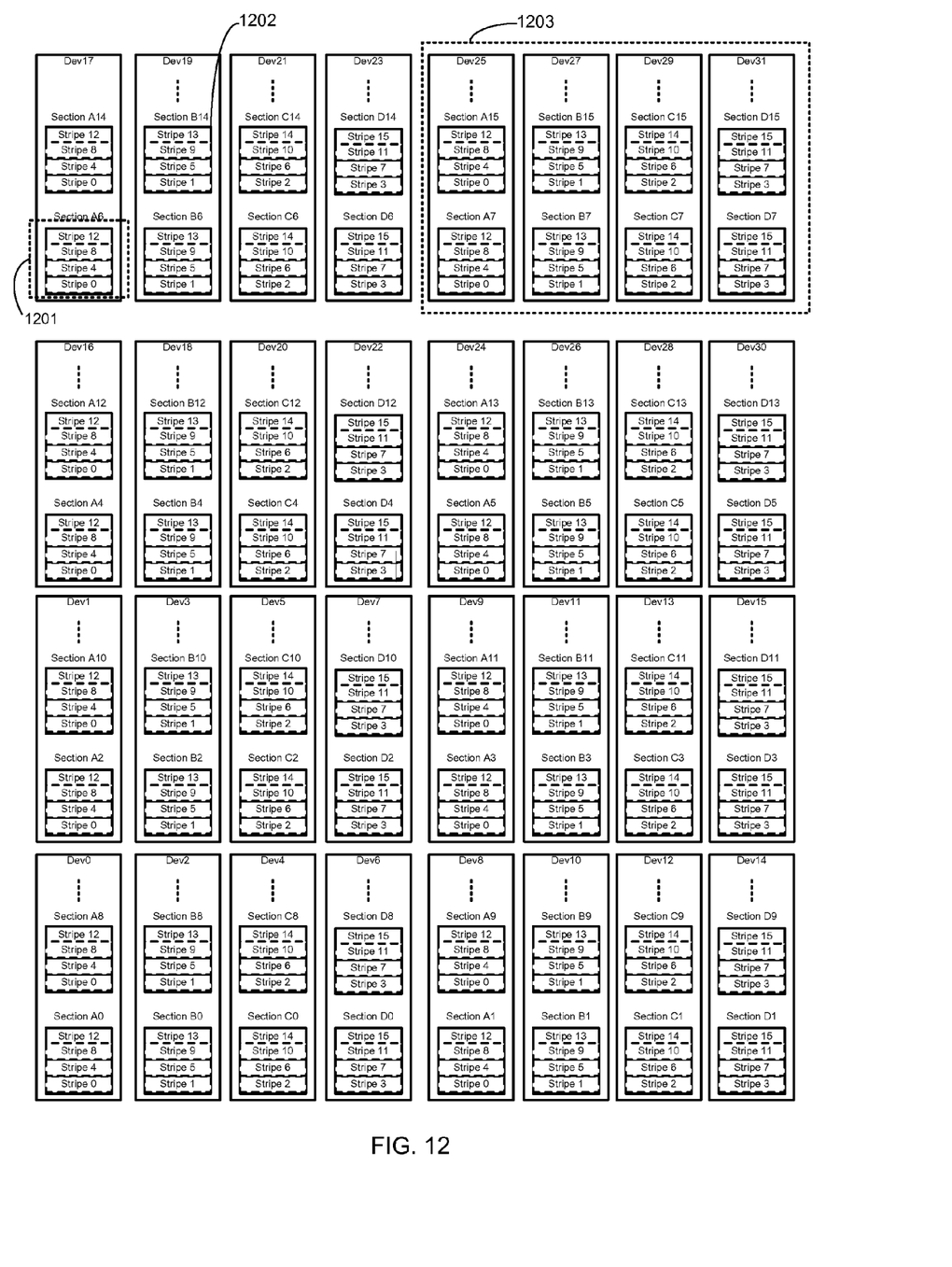
FIG. 12 is a sample physical layout with flash device level striping according to an embodiment of the present invention.
Figure 13:
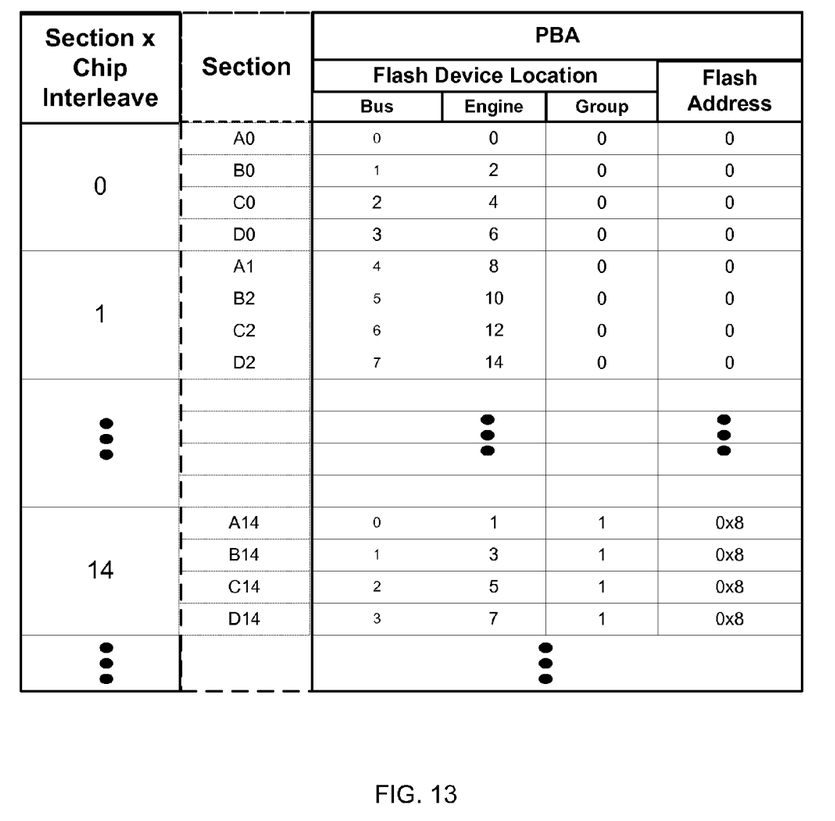
FIG. 13 is the LBA-PBA Map Table with striping for the layout shown in FIG. 12 according to an embodiment of the present invention.

FIG. 12 shows the layout of FIG. 2 with striping support. Keeping section 1201 size to be 4 KB, stripe 1202 size is 1 KB and the number of chip interleaves 1203 is four (4). This means thirty-two (32) LBAs will be distributed to four (4) chips (eight (8) per section) with two (2) LBAs comprising a stripe. FIG. 13 shows how the Map Table would look like. There would be four (4) related entries for a set of thirty-two (32) LBAs or four (4) sections. Size of the Map Table would still be the same but the LBAs will be striped to the different chips in each set. LBA 0, 1 would be in Dev 0; LBA 2, 3 in Dev 2; LBA 4, 5 in Dev 4; LBA 6, 7 in Dev 6; LBA 8, 9 back to Dev 0 and so on. As a consequence, when the host requests a read to LBAs 0-7, Engines 0, 2, 4, and 6 are activated to get the eight (8) LBAs instead of just engine 0 when there is no striping.

This is mostly advantageous for hosts that only access the disk one request at the time and those requests are small chunks of data (i.e. request only 4 KB and waits for a response every time). Without striping, the host was only able to utilize a few of the available resources. This advantage decreases once the host is capable of queuing up multiple requests or requests large amount of data. This is because in this scenario, the host requests have already forced the different Flash DMA Engines to work in parallel and thus utilized the system resources efficiently.

In one embodiment of the present invention, an apparatus for data storage comprises: a plurality of flash buses; a plurality of DMA Engines coupled to at least two (2) of the plurality of flash buses; and a plurality of flash chips coupled to at least two (2) of the plurality of DMA Engines; wherein data access performance is improved by bus interleaving wherein one or more data is transferred to or from the plurality of flash chips using at least two (2) flash buses; wherein data access performance is improved by flash array bank interleaving wherein one or more data is transferred to or from the plurality of flash chips using at least two (2) DMA Engines; and wherein data access performance is improved by group interleaving wherein one or more data is transferred to or from the plurality of flash chips using at least two (2) flash chips. Optionally, each of the plurality of flash chips further comprises a plurality of sections; each section in the apparatus is operable to be accessed using a physical block address comprising a least significant portion, a second least significant portion, a third least significant portion, and a fourth least significant portion; wherein the least significant portion comprises an order according to the plurality of flash buses, the second least significant portion comprises an order according to a plurality of DMA Engines each coupled to a same flash bus, the third least significant portion comprises an order according to a plurality of flash chips each coupled to a same DMA Engine, and the fourth least significant portion comprises an order according to the plurality of sections in a same flash chip; and wherein a logical block address for host data access is mapped to a physical block address according to a system whereby host data access performance is improved. Optionally, at least one section in at least one of the plurality of flash chips is designated as free section; at least one free section is pre-erased as target for at least one data relocation whereby flash write performance and bad block replacement performance are improved according to the system. Optionally, the system maps each logical block address to a physical block address in a linear mapping prior to the at least one data relocation; and the system designates a plurality of free sections evenly to each of the plurality of flash chips. Optionally, the system locates a target for each of the at least one data relocation for write operation according to a current load represented in a system queue based on a priority comprising firstly locating a free section corresponding to a different flash bus, secondly locating a free section corresponding to a different DMA Engine coupled to a same flash bus, and thirdly locating a free section corresponding to a different flash chips coupled to a same DMA Engine; and the system locates a target for each of the at least one data relocation for bad block management based on a priority comprising firstly locating a free section corresponding to a same flash chips, secondly locating a free section corresponding to a different flash chips coupled to a same DMA Engine, and thirdly locating a section corresponding to a different DMA Engine coupled to a same flash bus. Optionally, each section further comprises a plurality of strips; and the linear mapping further comprises one or more flash chip interleaves.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. An apparatus for data storage comprising:
    a plurality of flash buses;
    a plurality of DMA Engines coupled to at least two of the plurality of flash buses;
    a plurality of flash devices coupled to at least two of the plurality of DMA Engines;
    wherein data access performance is improved by bus interleaving wherein one or more data is transferred to or from the plurality of flash devices using at least two flash buses;
    wherein data access performance is improved by flash array bank interleaving wherein one or more data is transferred to or from the plurality of flash devices using at least two DMA Engines;
    wherein data access performance is improved by group interleaving wherein one or more data is transferred to or from the plurality of flash devices using at least two flash devices;
    wherein each of the plurality of flash devices further comprises a plurality of sections;
    wherein each section in the apparatus is operable to be accessed using a physical block address comprising a least significant portion, a second least significant portion, a third least significant portion, and a fourth least significant portion;
    wherein the least significant portion comprises an order according to the plurality of flash buses, the second least significant portion comprises an order according to a plurality of DMA Engines each coupled to a same flash bus, the third least significant portion comprises an order according to a plurality of flash devices each coupled to a same DMA Engine, and the fourth least significant portion comprises an order according to the plurality of sections in a same flash device; and
    wherein a logical block address for host data access is mapped to a physical block address according to a placement algorithm whereby host data access performance is improved.

2. The apparatus of claim 1:
    wherein at least one section in at least one of the plurality of flash devices is designated as a free section; and
    wherein at least one free section is pre-erased as target for at least one data relocation wherein flash write performance and bad block replacement performance are improved according to the placement algorithm.

3. The apparatus of claim 2:
    wherein the placement algorithm maps each logical block address to a physical block address in a linear mapping prior to the at least one data relocation; and
    wherein the placement algorithm designates a plurality of free sections evenly to each of the plurality of flash devices.

4. The apparatus of claim 3, wherein the placement algorithm locates a target for each of the at least one data relocation for write operation according to a current load represented in a system queue based on a priority comprising firstly locating a free section corresponding to a different flash bus, secondly locating a free section corresponding to a different DMA Engine coupled to a same flash bus, and thirdly locating a free section corresponding to a different flash device coupled to a same DMA Engine.

5. The apparatus of claim 3, wherein the placement algorithm locates a target for each of the at least one data relocation for bad block management based on a priority comprising firstly locating a free section corresponding to a same flash device, secondly locating a free section corresponding to a different flash device coupled to a same DMA Engine, and thirdly locating a section corresponding to a different DMA Engine coupled to a same flash bus.

6. The apparatus of claim 3:
    wherein each section further comprises a plurality of stripes; and
    wherein the linear mapping further comprises one or more flash device interleaves.

7. The apparatus of claim 6:
    wherein data striping occurs in more than one flash device.

* * * * *